US011592532B2

(12) United States Patent
Choi et al.

(10) Patent No.: US 11,592,532 B2
(45) Date of Patent: Feb. 28, 2023

(54) INTEGRATED LIGHT TRANSMISSION/RECEPTION OPTICAL SYSTEM MODULE AND SCANNING LIDAR HAVING SAME

(71) Applicant: KOREA ELECTRONICS TECHNOLOGY INSTITUTE, Seongnam-si (KR)

(72) Inventors: Hyunyong Choi, Gwangju (KR); Hyunchang Cho, Gwangju (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 910 days.

(21) Appl. No.: 16/460,203

(22) Filed: Jul. 2, 2019

(65) Prior Publication Data

US 2019/0324125 A1 Oct. 24, 2019

Related U.S. Application Data

(63) Continuation of application No. PCT/KR2017/006877, filed on Jun. 29, 2017.

(30) Foreign Application Priority Data

Jan. 2, 2017 (KR) .................. 10-2017-0000208

(51) Int. Cl.
*G01S 7/481* (2006.01)
*G01S 7/484* (2006.01)
(Continued)

(52) U.S. Cl.
CPC ............ *G01S 7/4817* (2013.01); *G01S 7/484* (2013.01); *G01S 17/89* (2013.01); *G02B 26/105* (2013.01)

(58) Field of Classification Search
CPC ...... G01S 7/4817; G01S 17/89; G02B 26/105
See application file for complete search history.

(56) References Cited

U.S. PATENT DOCUMENTS

2008/0316463 A1* 12/2008 Okada ............... G02B 26/0816
356/4.01
2009/0161091 A1* 6/2009 Yamamoto ............ G03B 21/53
353/69

(Continued)

FOREIGN PATENT DOCUMENTS

JP 2009-156646 A 7/2009
JP 2010-261792 A 11/2010
(Continued)

OTHER PUBLICATIONS

Notice of Allowance of corresponding Korean Patent Application No. 10-2017-0000208—2 pages (dated Nov. 20, 2018).

(Continued)

*Primary Examiner* — Michael A Lyons
(74) *Attorney, Agent, or Firm* — Knobbe, Martens, Olson & Bear, LLP

(57) ABSTRACT

In one embodiment, an integrated light transmission/reception optical system module includes a light receiving lens, a light source, and a light transmitting mirror. The light receiving lens receives light, concentrates the received light on a light detector disposed at a rear position, and has an optical path groove formed to be directed from a circumference to a central portion and formed to expose a front side. The light source outputs a pulse laser along the optical path groove from the circumference of the light receiving lens toward the central portion of the light receiving lens. The light transmitting mirror is disposed within the optical path groove, is located on a path of the pulse laser, and
(Continued)

reflects in a front direction the pulse laser outputted from the light source. Other embodiments are also possible.

12 Claims, 3 Drawing Sheets

(51) Int. Cl.
*G01S 17/89* (2020.01)
*G02B 26/10* (2006.01)

(56) References Cited

U.S. PATENT DOCUMENTS

| | | |
|---|---|---|
| 2012/0187283 A1 | 7/2012 | Yamada et al. |
| 2013/0135605 A1 | 5/2013 | Wada |
| 2016/0274222 A1* | 9/2016 | Yeun ............... G01S 7/4816 |
| 2018/0275251 A1* | 9/2018 | Choi ............... G01S 7/4815 |

FOREIGN PATENT DOCUMENTS

| | | |
|---|---|---|
| JP | 2011-085577 A | 4/2011 |
| JP | 2012-132917 A | 7/2012 |
| KR | 10-2003-0044675 A | 6/2003 |
| KR | 10-2014-0079985 A | 6/2014 |
| KR | 10-1629323 B1 | 6/2016 |
| KR | 10-2016-0078043 A | 7/2016 |
| KR | 10-2016-0112876 A | 9/2016 |
| WO | 2016/134321 A1 | 8/2016 |

OTHER PUBLICATIONS

International Search Report of corresponding PCT Application No. PCT/KR2017/006877—4 pages (dated Sep. 27, 2017).
Choi et al., "A Study on the Precision Optics Design for Scanning LiDar", Proceedings of 2016 KSMPE Spring Conference, The Korean Society of Manufacturing Process Engineers (Apr. 2016).
Office Action of corresponding Korean Patent Application No. 10-2017-0000208—7 pages (dated Mar. 21, 2018).
Extended European Search Report in corresponding European Patent Application No. 17887930.0 dated Dec. 4, 2019, 7 pages.

* cited by examiner

INTEGRATED LIGHT TRANSMISSION/RECEPTION OPTICAL SYSTEM MODULE AND SCANNING LIDAR HAVING SAME

Any and all priority claims identified in the Application Data Sheet, or any correction thereto, are hereby incorporated by reference under 37 CFR 1.57. For example, this application is a continuation application, and claims the benefit under 35 U.S.C. § 120 and § 365 of PCT Application No. PCT/KR20 17/006877 filed on Jun. 29, 2017, which is hereby incorporated by reference. PCT/KR2017/006877 also claimed priority from Korean Patent Application No. 10-2017-0000208 filed on Jan. 2, 2017 which is hereby incorporated by reference.

BACKGROUND

Field

The present disclosure relates to a scanning LiDAR. Particularly, the present disclosure relates to an integrated light transmission/reception optical system module having a simplified optical system structure and allowing an easy alignment of an optical system by integrating a light transmission optical system and a light reception optical system, and also relates to a scanning LiDAR including the optical system module.

Description of the Related Technology

A scanning LiDAR is used to measure surrounding objects (targets) such as geographic features, things, and obstacles. The scanning LiDAR acquires information about an object by measuring a return time of a pulse laser reflected by the object. Such acquired object information may include information about the existence of the object, the type of the object, the distance to the object, and the like.

The scanning LiDAR is used in various fields such as an automobile, a mobile robot, a ship, a security system, an assembly line, an unmanned airplane, a drone, and the like.

SUMMARY

A scanning LiDAR has an optical system structure in which a high-power laser diode outputs a diffusion beam, a collimation lens (light transmitting lens) concentrates and transmits the diffusion beam as parallel light, a large-diameter collecting lens (light receiving lens) receives light reflected by an object, and a photodetector detects the reflected light.

Therefore, a conventional scanning LiDAR requires at least two lenses. Also, in the conventional scanning LiDAR, a fine alignment operation of the optical system is essential. Because the number of alignment targets increases as the number of lenses included in the scanning LiDAR increases, the alignment operation causes an increase in price of the scanning LiDAR.

It is therefore an object of the present invention to provide an integrated light transmission/reception optical system module having a simplified optical system structure and allowing an easy alignment of an optical system, and provide a scanning LiDAR including the optical system module.

An integrated light transmission/reception optical system module according to the present invention includes a light receiving lens receiving light, concentrating the received light on a light detector disposed at a rear position, and having an optical path groove formed to be directed from a circumference to a central portion and formed to expose a front side; a light source outputting a pulse laser along the optical path groove from the circumference of the light receiving lens toward the central portion of the light receiving lens; and a light transmitting mirror disposed within the optical path groove, located on a path of the pulse laser, and reflecting in a front direction the pulse laser outputted from the light source.

In the integrated light transmission/reception optical system module, the light source may output the pulse laser toward the central portion of the light receiving lens in a direction perpendicular to the light received by the light receiving lens.

In the integrated light transmission/reception optical system module, the light transmitting mirror may be disposed at an angle of 45 degrees with respect to a traveling direction of the pulse laser outputted from the light source, thereby reflecting the pulse laser in the front direction.

In the integrated light transmission/reception optical system module, the light transmitting mirror may be located at the central portion of the light receiving lens and reflects the pulse laser in the front direction from the central portion of the light receiving lens.

The integrated light transmission/reception optical system module may further include a light reception frame supporting the light receiving lens; and a light transmission frame combined with the light reception frame, supporting the light source, and extended into the optical path groove to support the light transmitting mirror disposed within the light path groove.

An integrated light transmission/reception optical system module according to the present invention includes a light receiving lens receiving light, concentrating the received light to a rear position thereof, and having an optical path groove formed to be directed from a circumference to a central portion and formed to expose a front side; a light source outputting a pulse laser along the optical path groove from the circumference of the light receiving lens toward the central portion of the light receiving lens; a light transmitting mirror disposed within the optical path groove, located on a path of the pulse laser, and reflecting in a front direction the pulse laser outputted from the light source; and a light detector disposed at the rear position of the light receiving lens, and converting the light received by the light receiving lens into an electric signal.

A scanning LiDAR according to the present invention includes an optical system module including a light receiving lens receiving light, concentrating the received light to a rear position thereof, and having an optical path groove formed to be directed from a circumference to a central portion and formed to expose a front side, a light source outputting a pulse laser along the optical path groove from the circumference of the light receiving lens toward the central portion of the light receiving lens, a light transmitting mirror disposed within the optical path groove, located on a path of the pulse laser, and reflecting in a front direction the pulse laser outputted from the light source, and a light detector disposed at the rear position of the light receiving lens, and converting the light received by the light receiving lens into an electric signal; and a rotating reflective mirror unit installed at a front position of the optical system module, emitting light passing through the optical system module to a scan area while being rotated, and reflecting light reflected from the scan area to the optical system module while being rotated.

In the scanning LiDAR, the rotating reflective mirror unit may include a rotating motor; and a rotating reflective mirror coupled to the rotating motor to face the light transmitting mirror, rotated in accordance with rotation of the rotating motor, transmitting light reflected by and emitted from the light transmitting mirror to the scan area, and reflecting light reflected from the scan area to the light receiving lens.

In the scanning LiDAR, the rotating reflective mirror may be rotated about a rotation axis perpendicular to the pulse laser reflected by the light transmitting mirror.

In the scanning LiDAR, the rotating reflective mirror may be disposed at an angle of 45 degrees with respect to a traveling direction of the pulse laser reflected by the light transmitting mirror, and be rotated about a rotation axis corresponding to the traveling direction of the pulse laser.

In the scanning LiDAR according to the present invention, the light receiving lens has the optical path groove formed to be directed from the circumference to the central portion, and the light transmitting mirror is disposed at an angle of 45 degrees with respect to the light source at the central portion of the light receiving lens within the optical path groove. This parallelizes the transmitting pulse laser and the received light and also requires no additional element for directing the received light toward the light receiving lens. It is therefore possible to simplify the optical system structure.

Thus, according to the present invention, the scanning LiDAR having the simplified optical system structure can also realize an easy alignment of the optical system.

Further, in the scanning LiDAR according to the present invention, the light transmitting mirror is disposed at the central portion of the light receiving lens within the optical path groove in order to emit the pulse laser in a front direction from the central portion of the light receiving lens, so that the light can be received through the entire region of the light receiving lens except the optical path groove. This can increase the directing efficiency.

Moreover, in the scanning LiDAR according to the present invention, the light transmitting mirror and the light source are aligned to each other and combined with the light transmission frame, and also the light transmission frame is further combined with the light reception frame supporting the light receiving lens. This can facilitate the light alignment.

Besides, in the scanning LiDAR according to the present invention, the light transmitting mirror is disposed at the central portion of the light receiving lens to output the pulse laser along the rotation axis of the rotating reflective mirror, and also integrally formed inside the light receiving lens. Therefore, through the rotating reflective mirror which is being rotated at a 45-degree angle with respect to the rotation axis corresponding to the pulse laser, not only 360-degree scanning is allowed, but also the optical system structure is simplified to realize an easy alignment of the optical system.

DETAILED DESCRIPTION

In the following description, techniques that are well known in the art and not directly related to the present invention are not described. This is to clearly convey the subject matter of the present invention by omitting an unnecessary explanation.

The terms and words used in the following description and claims are not limited to the typical or bibliographical meanings thereof and are merely used by the inventor to enable a clear and consistent understanding of the invention. Therefore, it will be apparent to those skilled in the art that the following description about various embodiments of the present invention is provided for illustration purpose only and not for the purpose of limiting the invention as defined by the appended claims and their equivalents.

Hereinafter, embodiments of the present invention will be described in detail with reference to the accompanying drawings.

Figure 1:
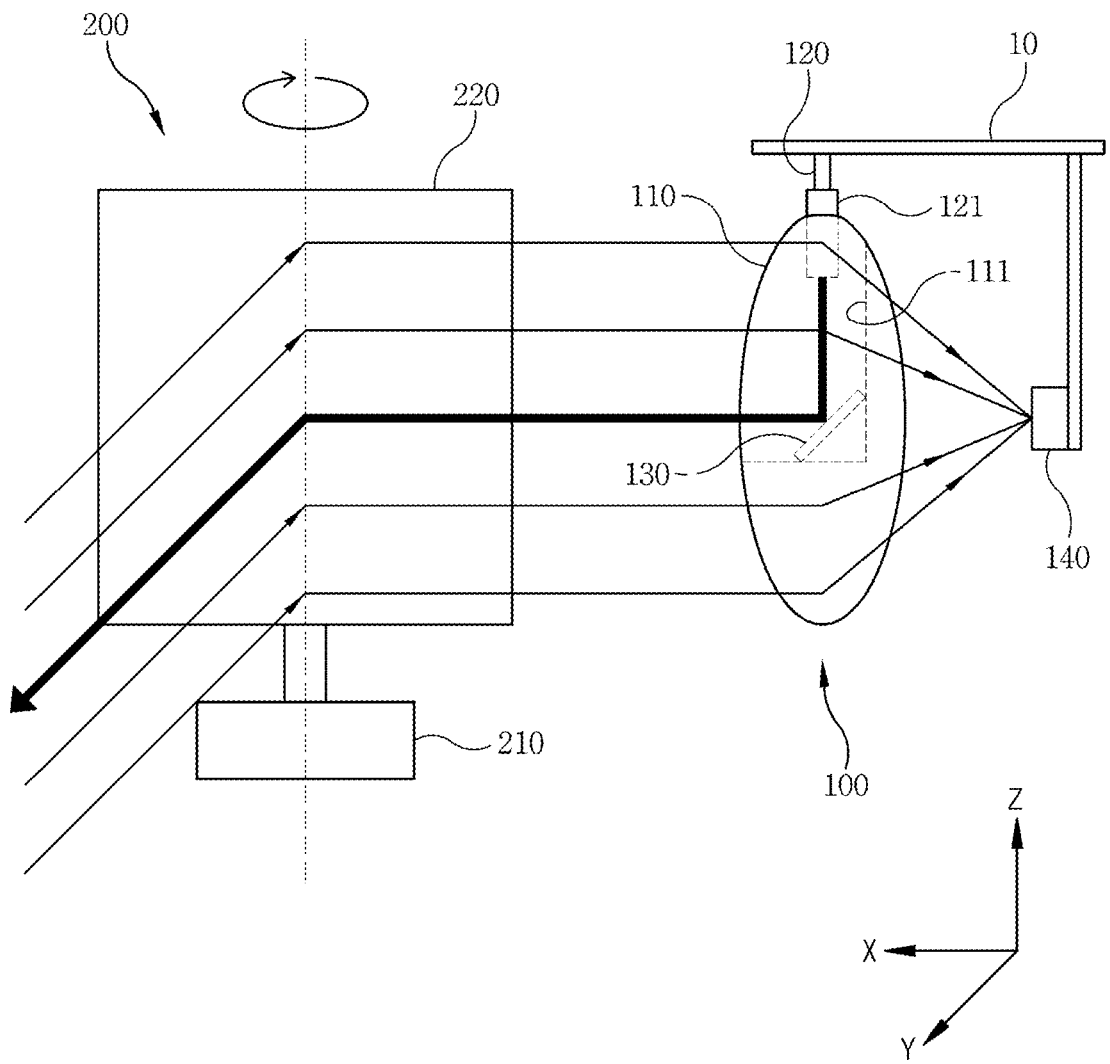
FIG. 1 is a diagram illustrating a structure of a scanning LiDAR according to an embodiment of the present invention.
Figure 2:
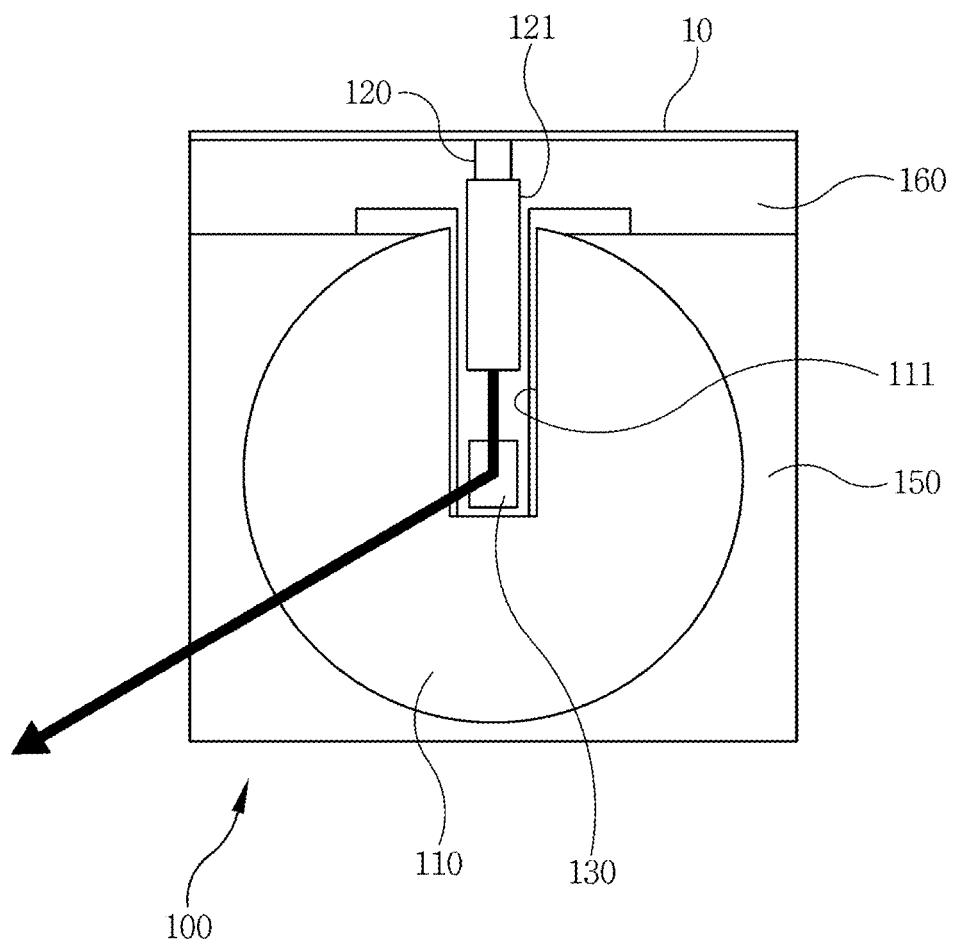
FIG. 2 is a diagram, viewed from front, illustrating an integrated light transmission/reception optical system module of a scanning LiDAR according to an embodiment of the present invention.

FIG. 1 is a diagram illustrating a structure of a scanning LiDAR according to an embodiment of the present invention, and FIG. 2 is a diagram, viewed from front, illustrating an integrated light transmission/reception optical system module of a scanning LiDAR according to an embodiment of the present invention.

Referring to FIGS. 1 and 2, the scanning LiDAR 300 according to an embodiment of the present invention includes an optical system module 100 and a rotating reflective mirror unit 200.

The optical system module 100 is installed on and driven by a printed circuit board 10 to transmit a pulse laser and collect light reflected and received from a scan area.

The printed circuit board 10 is connected to a light source 120 and a light detector 140, which will be described below, and can drive the light source 120 and the light detector 140. Although the scanning LiDAR 300 according to an embodiment of the present invention is illustrated in which the light source 120 and the light detector 140 are implemented on the single printed circuit board 10, the present invention is not limited thereto. Alternatively, the light source 120 and the light detector 140 may be disposed on separate individual printed circuit boards, respectively.

Meanwhile, although the scanning LiDAR 300 according to an embodiment of the present invention is shown in which the optical system module 100 is disposed under the printed circuit board 10, the present invention is not limited thereto. A positional relationship between the printed circuit board 10 and the optical system module 100 may be variously changed depending on the position of an optical path groove 111 of the optical system module 100. However, in the following description, it is assumed that the optical system module 100 is disposed under the printed circuit board 10.

The optical system module 100 includes a light receiving lens 110, a light source 120, a light transmitting mirror 130, and a light detector 140.

The light receiving lens 110 receives light reflected from a scan area and concentrates the light on the light detector 140. The light receiving lens 110 is formed of a circular convex lens, collects the light reflected from the scan area, and delivers the light to the light detector 140.

In addition, the light receiving lens 110 has the optical path groove 111 formed to be directed from the circumference to the central portion. The optical path groove 111 may be formed by etching the light receiving lens 110 formed of a circular convex lens from the circumference toward the central portion.

Through all portions except a portion where the optical path groove 111 is formed, the light receiving lens 110 can receive the light reflected from the scan area.

The optical path groove 111 accommodates the light transmitting mirror 130. Also, the optical path groove 111 may be formed to expose the front side thereof. In addition, the width between both inner sidewalls of the optical path groove 111 may have a minimum dimension that allows the light transmitting mirror 130 to be disposed. Preferably, the optical path groove 111 may be etched to expose the front and rear sides thereof, thereby facilitating an etching process from the circumference.

The light source 120 is driven by the printed circuit board 10 and outputs a pulse laser. The light source 120 may be disposed within the optical path groove 111 of the light receiving lens 110 or disposed apart from the optical path groove 111, and outputs a pulse laser to the central portion of the light receiving lens 110 along the optical path groove 111. That is, the light source 120 can output a pulse laser toward the light transmitting mirror 130 along the Z-axis.

When the optical path groove 111 of the light receiving lens 110 is located on the upper side as shown in FIG. 1, the light source 120 is disposed above the light receiving lens 110 and can output a pulse laser toward the lower side of the light receiving lens 110. In this case, the pulse laser outputted from the light source 120 may be in a direction perpendicular to light received by the light receiving lens 110.

The light source 120 may be a single-channel or multi-channel light source that outputs one or more pulse lasers corresponding to one or more channels. The pulse laser outputted from the light source 120 is converted into a collimate beam or a divergence beam by a light adjuster 121 installed in a path, and then outputted to the light transmitting mirror 130. Thus, the light detector 140 can be implemented to receive reflected light of single-channel or multi-channel.

The light transmitting mirror 130 reflects the pulse laser outputted from the light source 120 and thereby emits the pulse laser in the front direction. The light transmitting mirror 130 is disposed within the optical path groove 111 of the light receiving lens 110.

Within the optical path groove 111, the light transmitting mirror 130 may be located at the central portion of the light receiving lens 110 so that the pulse laser can be emitted in the front direction from the central portion of the light receiving lens 110. That is, the light transmitting mirror 130 can reflect the pulse laser emitted along the Z-axis from the light source 120 in the front direction along the X-axis.

In addition, the light transmitting mirror 130 is disposed at an angle of 45 degrees with respect to the traveling direction of the pulse laser outputted from the light source 120, thereby reflecting the pulse laser outputted from the light source 120 in the front direction which is perpendicular to the traveling direction.

The light detector 140 converts the light received from the light receiving lens 110 into an electric signal. The light detector 140 may be disposed at a rear position of the light receiving lens 110, and converts the light, which is reflected by a measurement target and then collected through the light receiving lens 110, into an electric signal. The light detector 140 may output the electric signal to an external device. The light detector 140 may be installed on the printed circuit board 10 on which the light source 120 is installed, or on a separate printed circuit board.

Meanwhile, the optical system module 100 according to an embodiment of the present invention may further include a light reception frame 150 and a light transmission frame 160.

The light reception frame 150 is capable of supporting the light receiving lens 110.

The light reception frame 150 may be combined with the circumference of the light receiving lens 110 to support the light receiving lens 110, except for the front and rear surfaces of the light receiving lens 110.

The light transmission frame 160 may be combined with the light reception frame 150 and extended into the optical path groove 111 of the light receiving lens 110. The light transmission frame 160 is capable of supporting the light transmitting mirror 130 within the light path groove 111 and also supporting the light source 120 within or outside the light path groove 111. The light transmitting mirror 130 and the light source 120 may be combined with the light transmission frame 160 while being aligned to each other.

That is, the light transmitting mirror 130 and the light source 120 may be aligned to each other and fixedly supported by the light transmission frame 160. The light transmission frame 160 combined with both the light transmitting mirror 130 and the light source 120 may be further combined with the light reception frame 150 fixedly supporting the light receiving lens 110. Thus, a light transmission optical system and a light reception optical system can be integrated with each other.

As such, by further combining the light transmission frame 160, which is combined with both the light transmitting mirror 130 and the light source 120, with the light reception frame 150 which supports the light receiving lens 110, the optical system module 100 according to an embodiment of the present invention can perform the light alignment.

The rotating reflective mirror unit 200 is installed to be spaced apart from the optical system module 100. While being rotated, the rotating reflective mirror unit 200 emits, to a scan area, the light that has passed through the optical system module 100. In addition, while being rotated, the rotating reflective mirror unit 200 reflects, to the optical system module 100, the light reflected from the scan area. Meanwhile, in this embodiment, the rotating reflective mirror unit 200 is shown as if it is combined with a separate printed circuit board different from that of the optical system module 100. However, although not shown, the rotating reflective mirror unit 200 may be rotatably installed on the same printed circuit board 10 as the optical system module 100, and can be driven by the printed circuit board 10.

The rotating reflective mirror unit 200 includes a rotating motor 210 and a rotating reflective mirror 220.

The rotating motor 210 rotates the rotating reflective mirror 220. Specifically, the rotating motor 210 is capable of rotating the rotating reflective mirror 220 about a rotation axis perpendicular to the pulse laser emitted from the light transmitting mirror 130. That is, the rotating motor 210 can rotate the rotating reflective mirror 220 with respect to the Z-axis as the rotation axis.

The rotating reflective mirror 220 is coupled to the rotation axis of the rotating motor 210 and rotated in accordance with the rotation of the rotating motor 210. While rotated, the rotating reflective mirror 220 transmits the pulse laser, which is reflected by and emitted from the light transmitting mirror 130, to the scan area, and then reflects the light reflected from the scan area to the light receiving lens 110.

The rotating reflective mirror 220 may be a plane mirror having two reflection planes. The rotating reflective mirror 220 is disposed between the optical system module 100 and the measurement target and is capable of being rotated through 360 degrees by the rotating motor 210.

Through a 360-degree rotation, the rotating reflective mirror 220 reflects a collimate beam or a divergence beam, which is outputted from the light transmitting mirror 130, to the scan area where a measurement target may exist. Then, the rotating reflective mirror 220 reflects the light, which is reflected by the measurement target, to the light receiving lens 110 again. The pulse laser outputted from the light transmitting mirror 130 is reflected to the scan area through the central portion of the rotating reflective mirror 220, and the light reflected and received from the scan area is reflected to the light receiving lens 110 through the upper or lower portion of the rotating reflective mirror 220.

Meanwhile, although not shown, the above-described elements constituting the scanning LiDAR 300 according to an embodiment of the present invention, such as the printed circuit board 10, the optical system module 100, and the rotating reflective mirror unit 200, may be built in a housing and protected from an external environment.

As described above, in the scanning LiDAR 300 according to an embodiment of the present invention, the light receiving lens 110 has the optical path groove 111 formed to be directed from the circumference to the central portion, and the light transmitting mirror 130 is disposed at an angle of 45 degrees with respect to the light source 120 at the central portion of the light receiving lens 110 within the optical path groove 111. This parallelizes the transmitting pulse laser and the received light and also requires no additional element for directing the received light toward the light receiving lens 110. It is therefore possible to simplify the optical system structure.

Thus, according to an embodiment of the present invention, the scanning LiDAR 300 having the simplified optical system structure can also realize an easy alignment of the optical system.

Further, in the scanning LiDAR 300 according to an embodiment of the present invention, the light transmitting mirror 130 is disposed at the central portion of the light receiving lens 110 within the optical path groove 111 in order to emit the pulse laser in the front direction from the central portion of the light receiving lens 110, so that the light can be received through the entire region of the light receiving lens 110 except the optical path groove 111. This can increase the directing efficiency.

Moreover, in the scanning LiDAR 300 according to an embodiment of the present invention, the light transmitting mirror 130 and the light source 120 are aligned to each other and combined with the light transmission frame 160, and also the light transmission frame 160 is further combined with the light reception frame 150 supporting the light receiving lens 110. This can facilitate the light alignment.

Hereinafter, a scanning LiDAR according to another embodiment of the present invention will be described.

Meanwhile, the scanning LiDAR 400 according to another embodiment of the present invention has the substantially same configuration as that of the scanning LiDAR 300 according to the above-described embodiment of the present invention except for the rotating reflective mirror unit. Therefore, repeated description of the same configuration will be omitted, and the same names and reference numerals will be given to the same configurations.

Figure 3:
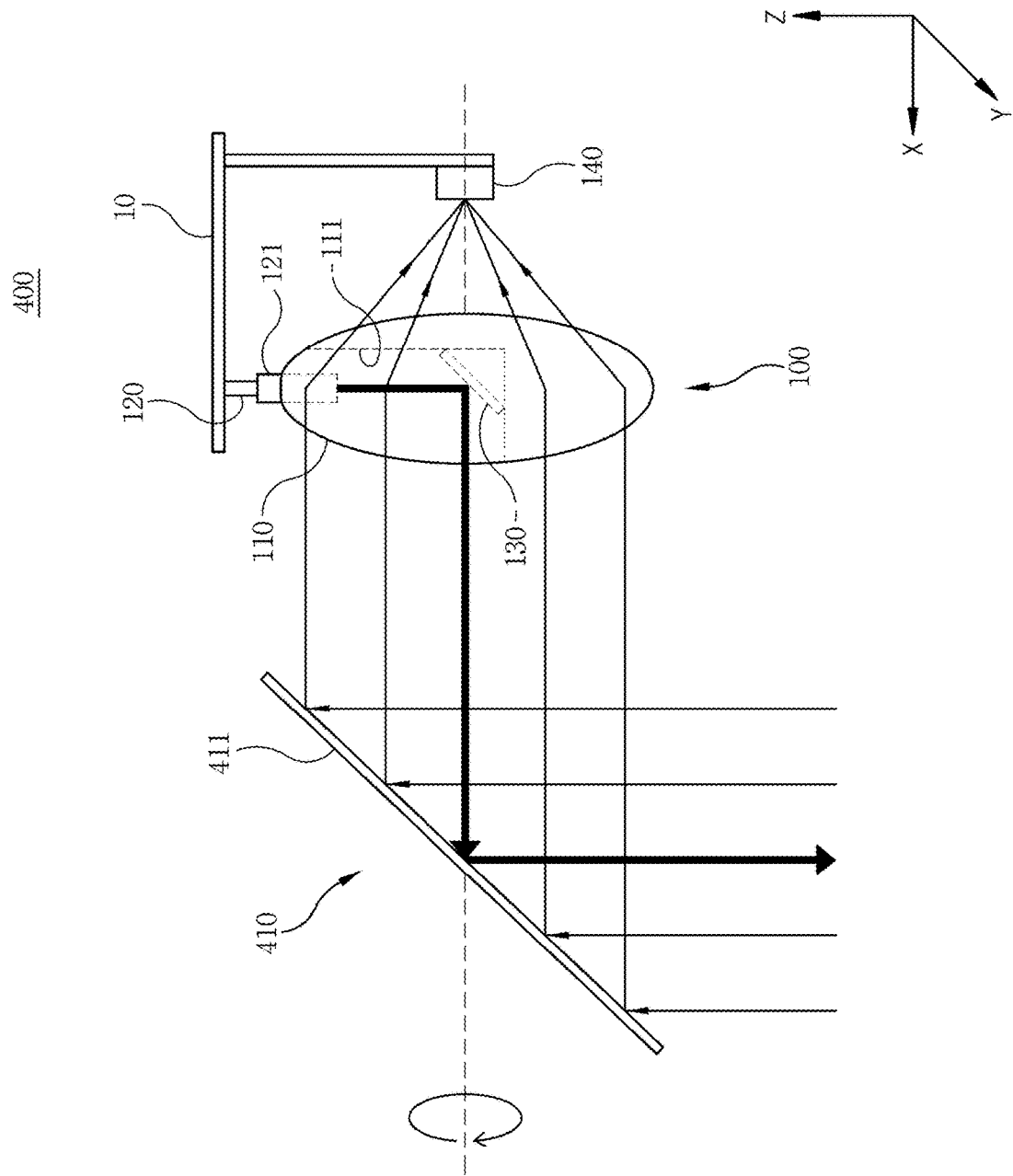
FIG. 3 is a diagram illustrating a structure of a scanning LiDAR according to another embodiment of the present invention.

FIG. 3 is a diagram illustrating a structure of a scanning LiDAR according to another embodiment of the present invention.

Referring to FIG. 3, the scanning LiDAR 400 according to another embodiment of the present invention includes the optical system module 100 and a rotating reflective mirror unit 410.

The rotating reflective mirror unit 410 may include a rotating motor (not shown) and a rotating reflective mirror 411.

The rotating motor rotates the rotating reflective mirror 411. Specifically, the rotating motor is capable of rotating the rotating reflective mirror 411 about a rotation axis coinciding with the pulse laser emitted from the light transmitting mirror 130. That is, the rotating motor may be disposed in a direction facing the light transmitting mirror 130 and includes the rotation axis coinciding with the pulse laser emitted from the light transmitting mirror 130.

The rotating reflective mirror 411 is coupled to the rotation axis of the rotating motor and rotated in accordance with the rotation of the rotating motor. While rotated, the rotating reflective mirror 411 transmits the pulse laser, which is reflected by and emitted from the light transmitting mirror 130, to the scan area, and then reflects the light reflected from the scan area to the light receiving lens 110.

The rotating reflective mirror 411 may be a plane mirror having at least one reflection plane. The rotating reflective mirror 411 is disposed at an angle of 45 degrees with respect to a traveling direction of the pulse laser reflected by the light transmitting mirror 130 and may be rotated about the rotation axis corresponding to the traveling direction of the pulse laser.

As such, because the rotating reflective mirror 411 is rotated at a 45-degree angle with respect to the rotation axis corresponding to the pulse laser, it is possible to perform 360-degree scanning.

Meanwhile, in the scanning LiDAR 400 according to another embodiment of the present invention in which the rotating reflective mirror 411 is disposed at an angle of 45 degrees with respect to the pulse laser and is rotated about the rotation axis parallel to the pulse laser, if the pulse laser is emitted while being spaced apart from and in parallel with the rotation axis rather than emitted exactly along the rotation axis of the rotating reflective mirror 411, the pulse laser may be reflected unevenly to the scan area due to the rotation of the rotating reflective mirror 411 which is inclined at an angle of 45 degrees.

That is, the scanning LiDAR 400 according to another embodiment of the present invention may be implemented optically when the pulse laser is transmitted along the rotation axis of the rotating reflective mirror 411.

As described above, in the scanning LiDAR 400 according to another embodiment of the present invention, the light transmitting mirror 130 is disposed at the central portion of the light receiving lens 110 to output the pulse laser along the rotation axis of the rotating reflective mirror 411, and also integrally formed inside the light receiving lens 110. Therefore, through the rotating reflective mirror 411 which is being rotated at a 45-degree angle with respect to the rotation axis corresponding to the pulse laser, not only 360-degree scanning is allowed, but also the optical system structure is simplified to realize an easy alignment of the optical system.

While this disclosure has been particularly shown and described with reference to an exemplary embodiment thereof, it will be understood by those skilled in the art that various changes in form and details may be made therein without departing from the scope of the present invention as defined by the appended claims.

What is claimed is:

1. An integrated light transmission/reception optical system module comprising:
   a light receiving lens configured to receive light and concentrate the received light on a light detector disposed at a rear position, the light receiving lens having an optical path groove extending from a circumference of the light receiving lens to a central portion of the light receiving lens and formed to expose a front side;
   a light source configured to output a pulse laser along the optical path groove from the circumference of the light receiving lens toward the central portion of the light receiving lens; and
   a light transmitting mirror disposed within the optical path groove, located on a path of the pulse laser, and configured to reflect in a front direction the pulse laser outputted from the light source.

2. The integrated light transmission/reception optical system module of claim 1, wherein the light source is configured to output the pulse laser toward the central portion of the light receiving lens in a direction perpendicular to the light received by the light receiving lens.

3. The integrated light transmission/reception optical system module of claim 2, wherein the light transmitting mirror is disposed at an angle of 45 degrees with respect to a traveling direction of the pulse laser outputted from the light source, and configured to reflect the pulse laser in the front direction.

4. The integrated light transmission/reception optical system module of claim 3, wherein the light transmitting mirror is located at the central portion of the light receiving lens and is configured to reflect the pulse laser in the front direction from the central portion of the light receiving lens.

5. The integrated light transmission/reception optical system module of claim 1, further comprising:
   a light reception frame supporting the light receiving lens; and
   a light transmission frame combined with the light reception frame, supporting the light source, and extended into the optical path groove to support the light transmitting mirror disposed within the light path groove.

6. The integrated light transmission/reception optical system module of claim 1, wherein the optical path groove comprises an inner wall having a width greater than that of the light transmitting mirror such that the light transmitting mirror does not contact the inner wall.

7. The integrated light transmission/reception optical system module of claim 1, further comprising a light adjuster coupled to the light source and configured to collimate or diverge the pulse laser output from the light source, wherein at least a portion of the light adjuster is accommodated inside the optical path groove.

8. An integrated light transmission/reception optical system module comprising:
   a light receiving lens configured to receive light and concentrate the received light to a rear position thereof, the light receiving lens having an optical path groove extending from a circumference of the light receiving lens to a central portion of the light receiving lens and formed to expose a front side;
   a light source configured to output a pulse laser along the optical path groove from the circumference of the light receiving lens toward the central portion of the light receiving lens;
   a light transmitting mirror disposed within the optical path groove, located on a path of the pulse laser, and configured to reflect in a front direction the pulse laser outputted from the light source; and
   a light detector disposed at the rear position of the light receiving lens, and configured to convert the light received by the light receiving lens into an electric signal.

9. A scanning LiDAR comprising:
   an optical system module including:
   a light receiving lens configured to receive light and concentrate the received light to a rear position thereof, the light receiving lens having an optical path groove extending from a circumference of the light receiving lens to a central portion of the light receiving lens and formed to expose a front side,
   a light source configured to output a pulse laser along the optical path groove from the circumference of the light receiving lens toward the central portion of the light receiving lens,
   a light transmitting mirror disposed within the optical path groove, located on a path of the pulse laser, and configured to reflect in a front direction the pulse laser outputted from the light source, and
   a light detector disposed at the rear position of the light receiving lens, and configured to convert the light received by the light receiving lens into an electric signal; and
   a rotating reflective mirror unit installed at a front position of the optical system module, configured to emit light passing through the optical system module to a scan area while being rotated, and reflect light reflected from the scan area to the optical system module while being rotated.

10. The scanning LiDAR of claim 9, wherein the rotating reflective mirror unit includes:
    a rotating motor; and
    a rotating reflective mirror coupled to the rotating motor to face the light transmitting mirror, rotated in accordance with rotation of the rotating motor, configured to transmit light reflected by and emitted from the light transmitting mirror to the scan area, and reflect light reflected from the scan area to the light receiving lens.

11. The scanning LiDAR of claim 10, wherein the rotating reflective mirror is rotated about a rotation axis perpendicular to the pulse laser reflected by the light transmitting mirror.

12. The scanning LiDAR of claim 10, wherein the rotating reflective mirror is disposed at an angle of 45 degrees with respect to a traveling direction of the pulse laser reflected by the light transmitting mirror, and is rotated about a rotation axis corresponding to the traveling direction of the pulse laser.

* * * * *